Patented Sept. 28, 1954

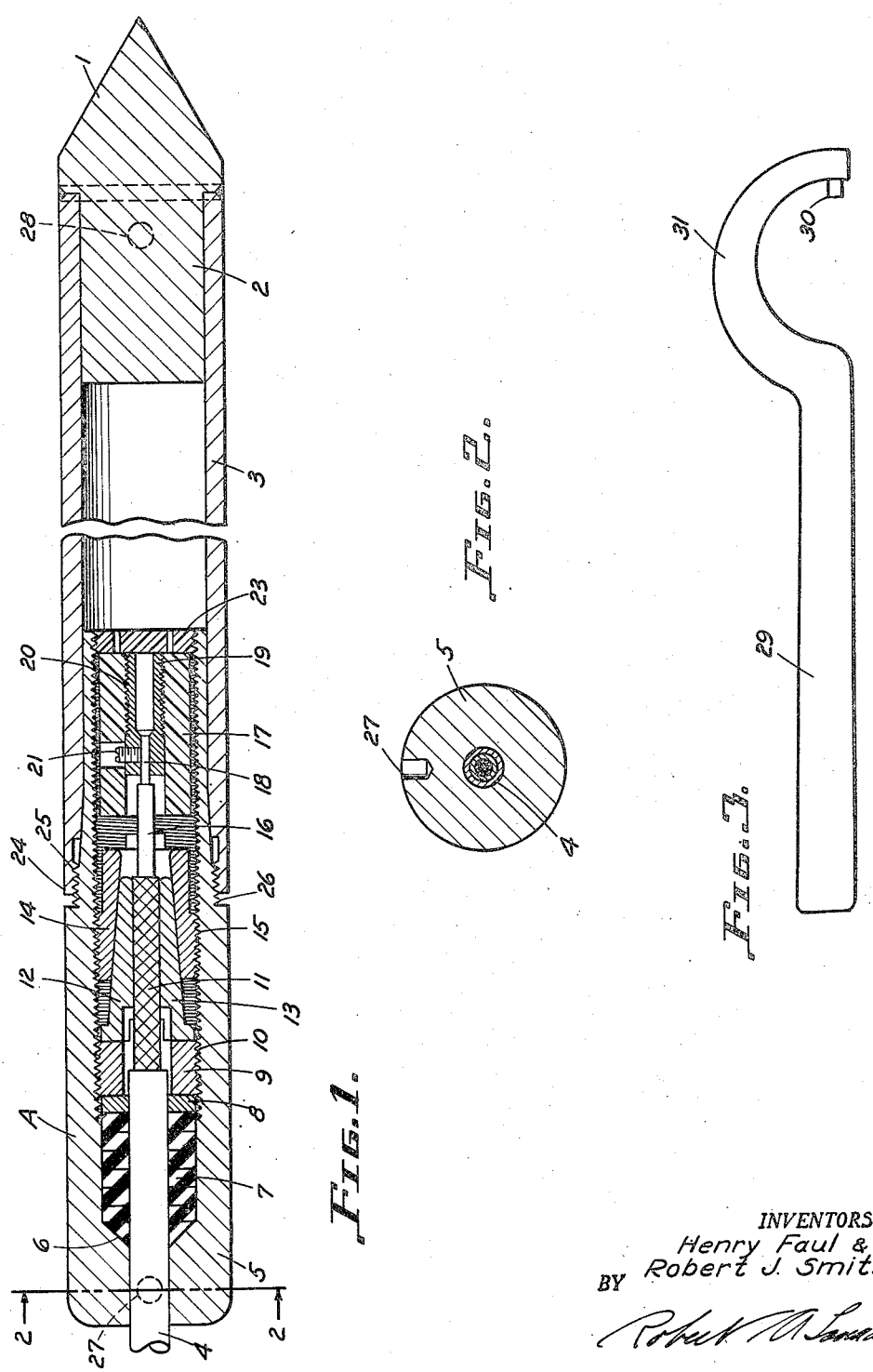
INVENTORS
Henry Faul &
BY Robert J. Smith

2,690,468

UNITED STATES PATENT OFFICE 2,690,468

DRILL HOLE LOGGING PROBE

Henry Faul, Middlesex County, Mass., and Robert J. Smith, Elmhurst, Ill., assignors, by mesne assignments, to the United States of America as represented by the United States Atomic Energy Commission Application April 4, 1947, Serial No. 739,522

1 Claim. (Cl. 174—35)

Our invention relates to probes, and more particularly to drill hole logging probes for detecting the presence of radioactive substances in drill holes and the like and at various depths.

It has already been found advantageous to lower various types of measuring equipment into wells or other openings in the earth and to make a series of measurements therein that will provide a parameter of conditions related to the structure surrounding the well bore, in correlation with depth. These parameters are commonly referred to as "well logs." They are generally formed by making a continuous series of measurements of some kind in a well bore over a continuous range of depths and plotting the measurements graphically so as to give a continuous curve of depth versus the magnitude of the characteristic being measured.

The practice has been to inclose a counter and transmitter, responsive to radioactivity, in a probe to offer mechanical protection as well as to insulate them from contact with water. Examples of the practices of the prior art may be found in the patents to Hassler 2,197,453; Scherbatskoy et al. 2,349,225; Bender 2,133,776; and Kalb et al. 2,365,763. It has been difficult to provide adequate electrostatic shielding, water-tight sealing under hydrostatic pressure, adequate mechanical protection to provide the necessary support for the assembly, and a compact unit sufficiently small to be useful in connection with holes or wells of small diameter.

Applicants with a knowledge of these problems in the prior art have for an object of their invention the provision of a logging probe for housing a counter and transmitting circuit with essential shielding therefor.

Applicants have as another object of their invention the provision of a logging probe having physical shielding against beta rays and other objectionable radiations.

Applicants have as another object of their invention the provision of a logging probe which will offer water-tight sealing under large hydrostatic pressure.

Applicants have as a further object of their invention the provision of a logging probe having a mechanical connection to the logging cable of such strength as to support many times the weight of the assembly.

Applicants have as a further object of their invention the provision of a logging probe made up of a series of sections connected by flush joints which minimize spalling of the rocks during logging and reduce radioactive contamination from active zones.

Applicants have as a further object of their invention the provision of a logging probe which is particularly well adapted for exploring bore holes of small diameter.

Other objects and advantages of our invention will appear from the following specification and accompanying drawings, and the novel features thereof will be particularly pointed out in the annexed claims.

In the drawings, Fig. 1 is a sectional elevation of our improved logging probe. Fig. 2 is a cross section of the probe taken along the line 2—2 of Fig. 1. Fig. 3 is a schematic of the tool employed to assemble the probe.

The drill hole logging probe has an elongated body of substantially cylindrical configuration and is preferably made of brass, bronze, or stainless steel. The body is comprised of three major portions. The lowermost portion 1 is formed into a solid tip which tapers down to a point at its lower end, and the construction thereof is fully disclosed in Fig. 1 of the drawings. The upper end 2 of the tip 1 is of reduced diameter and telescopes to a press fit within the elongated tubular central or intermediate portion 3. In addition or as an alternative, the joint between the tip 1 and the intermediate portion 3 may be sealed by soldering or otherwise. The hollow central portion 3 of the body is adapted to receive and house a counter, such as a Geiger-Muller tube, and a transmitter. However, these latter elements have been omitted from the drawings for the purpose of clarity, and because their particular construction forms no part of this invention. Known constructions of these elements may be utilized in this assembly. The tube and transmitter are connected to an instrument at the top of the bore and on the surface of the earth by means of a shielded cable 4. The third or uppermost of the three body portions 5 is cylindrical, hollow, and has an axial opening at its upper end through which the body of the cable extends to the interior of the body of the casing or housing A. The elements within the upper member 5 of the body A, and the upper portion of the intermediate member 3 thereof are for providing rigid mechanical connections between the body A and the cable 4. They also act as a water-tight seal against several hundred feet of hydrostatic pressure and provide shielding against unwanted radiation, such as beta rays. The assembly as a whole provides essential electrostatic shielding of the counter tube and transmitting circuit, and the casing provides the shield against beta rays.

Positioned in the upper end of the body portion 5 to surround and engage the sheath of the cable 4 is a bank 7 of soft rubber washers. The bank 7 of rubber washers is compressed against the cable sheath or insulation by means of ring 8 engaged with one end of the washer bank 7, and the slanting or tapering wall 6 of the body portion 5 engaged with the opposite end of the washer bank 7. The ring 8 is forced against the lower end of the washer bank 7 by means of a thimble 9, the outer surface of which is threaded at 10 for engagement with screw threads on the inner wall of the upper body portion 5. The outer insulation of the shielded cable 4 is cut away below the point where the cable passes through the thimble 9 so as to expose the shielding mesh 11 of the cable 4. The shielding mesh 11 is engaged by a pair of brass fingers 12, 13 which form a separate sleeve. The exterior walls of the fingers 12, 13 are tapered towards their lower ends to fit in a complementary tapered sleeve 14. The outer space or wall of sleeve 14 is threaded to provide external screw threads 15 which mesh with the internal screw threads of the inner wall of the upper body portion 5. As the sleeve 14 is screwed up into the body of the uppermost body portion 5, by lugs projecting from one end thereof, the fingers 12, 13 are compressed inwardly by the cam action of the tapered inner walls of the sleeve 14 on the tapered outer walls of the fingers 12, 13. As the fingers 12, 13 are thus moved towards each other, they grip the shielding mesh 11 on the cable 4 and tend to hold the cable in place and to ground the casing to the shielding.

Below the fingers 12, 13 the shielding mesh of the cable is cut away so as to expose the inside cable insulation 16. This insulation extends into the upper end of the bore of a Lucite or polystyrene tube 17 which is disposed about the cable 4 and is positioned in the lower portion of the upper body element 5. The inside cable insulation is cut away to expose the central conductor 18 which fits in an axial bore of a small, elongated thimble 19 whose outer surface carries external screw threads 20 to coact with threads in the bore of the plastic tube 17 to provide adjustment. The thimble 19 may be locked in position by screw 21 which passes through a transverse opening in the wall of the tube 17 and threads into a bore in the wall of the thimble 19.

Finally, a plastic disc 23, having a threaded periphery, is in screw-threaded engagement with the lower end of the internally screw-threaded upper body portion 5. In this connection, it will be noted that the lower end of the upper body portion 5 extends or is telescoped into the central body portion 3 for a considerable distance, there being a tapered fit within the two members. The upper end 24 of the intermediate member 3 has threads 25 on its inner walls for engaging a threaded skirt 26 on the upper body portion 5.

It will be seen that the arrangement is such that the intermediate body portion 3 may be unscrewed from the upper body portion 5, and the cable fittings can then all be easily removed from the upper body portion 5. By assembling the fittings in the order described, the upper body portion 5 may be securely attached to the cable 4 and subsequently the electrical connections to the transmitter and tube may be made.

The elongated thimble 19 may be so constructed as to make contact automatically upon closing of the probe with a standard banana plug built into the body of the electric circuit or transmitting equipment housed in intermediate section 3 of the probe. For this purpose plastic disc 23 may be replaced by one having a central opening therein to cooperate with opening or bore in thimble or connector 19.

To facilitate the assembly of the upper and intermediate body portions 5, 3, respectively, recesses or openings 27, 28 may be provided in their walls for the reception of the lug 30 of a wrench or tool 29 for tightening the two sections. The curved neck 31 of the tool 29 engages about the circumference of the body of either section 5 or section 3 with the lug 30 interlocked thereto by seating in either recess 27 or recess 28. With like tools or wrenches 29 on the two sections 5, 3 of the probe, rotational force can be exerted to interlock the sections in tight relation by means of threads 25. These tools may be reversed in their positions on the body sections 5, 3 and force applied in the opposite direction to unscrew and disengage the two sections.

Having thus described our invention, we claim:

A logging probe for housing radiation detecting equipment comprising an elongated hollow casing including a plurality of sections fitted together in overlapping telescopic engagement, a chamber in said casing having tapered walls adjacent one end of the casing, a shielded cable extending into the casing through said end and terminating in the chamber for suspending it in a bore hole and for grounding the casing, a series of resilient packing elements disposed within the chamber adjacent said end and disposed about the cable, a ring spaced from said end and positioned in the chamber beyond but adjacent to the packing elements and screw threadedly engaged with the casing for contact with said packing elements to compress them against the tapering walls of the casing and into tight gripping relation with the cable and form a water tight seal, wedge shaped clamping elements of conductive material disposed about the cable and spaced from and located beyond the packing elements and near the end of the cable, a thimble threadedly engaged with the inner walls of the chamber at an intermediate portion thereof and having a tapered bore for reception of and engagement with the wedge shaped clamping elements to urge them towards each other and into tight gripping relation with the shielding on the cable to provide a support for the casing and to initiate electrical contact therewith, and a connector rigidly mounted on the conductor of the cable and insulated from the casing to provide an electrical connection for the detecting equipment.

References Cited in the file of this patent

UNITED STATES PATENTS

| Number | Name | Date |
| --- | --- | --- |
| 1,459,047 | Crossley | June 29, 1923 |
| 1,930,322 | Paulson | Oct. 10, 1933 |
| 2,001,946 | Tschappat | May 21, 1935 |
| 2,173,643 | Moser | Sept. 19, 1939 |
| 2,195,630 | Papp et al. | Apr. 2, 1940 |
| 2,412,575 | Frosch | Dec. 17, 1946 |
| 2,416,702 | Krasnow | Mar. 4, 1947 |
| 2,424,545 | Bard | July 29, 1947 |
| 2,425,834 | Salisbury | Aug. 19, 1947 |
| 2,449,570 | Violette | Sept. 21, 1948 |